L. M. MOWE.
STARTING DEVICE FOR EXPLOSIVE ENGINES.
APPLICATION FILED OCT. 2, 1912.
1,077,094.
Patented Oct. 28, 1913.
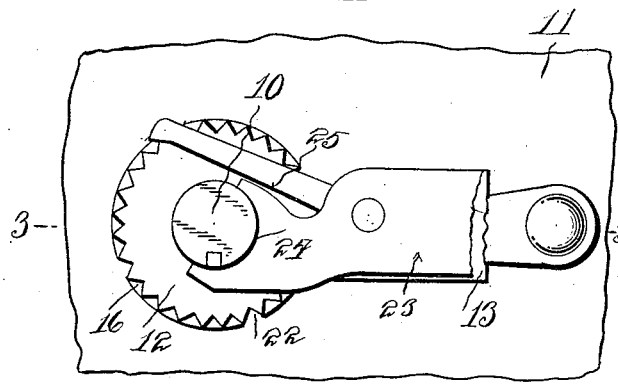
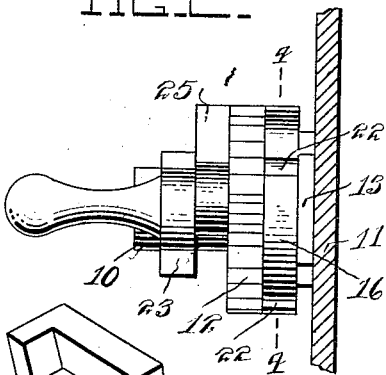
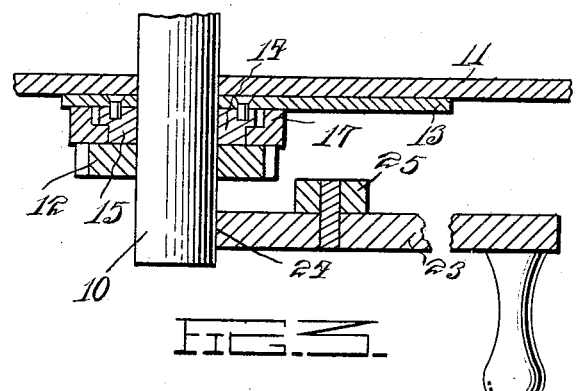
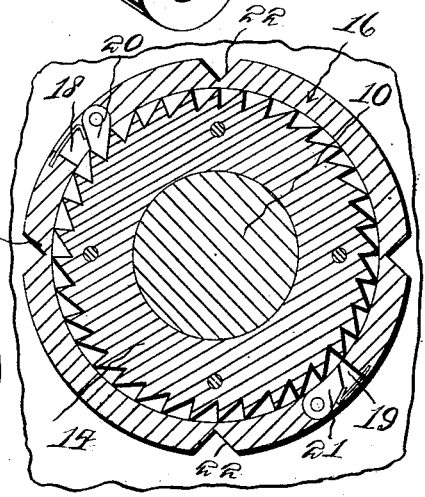
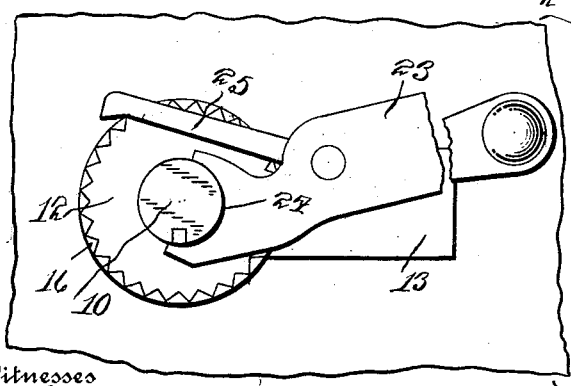
Witnesses
J. H. Taylor
Henry T. Bright
Inventor
L. M. Mowe.
By Chandler & Chandler
Attorneys

UNITED STATES PATENT OFFICE.

LESTER M. MOWE, OF DEEP RIVER, WASHINGTON.

STARTING DEVICE FOR EXPLOSIVE-ENGINES.

1,077,094.  Specification of Letters Patent.  Patented Oct. 28, 1913.

Application filed October 2, 1912. Serial No. 723,585.

*To all whom it may concern:*

Be it known that I, LESTER M. MOWE, a citizen of the United States, residing at Deep River, in the county of Wahkiakum, State of Washington, have invented certain new and useful Improvements in Starting Devices for Explosive-Engines; and I do hereby declare the following to be a full, clear, and exact description of the invention, such as will enable others skilled in the art to which it appertains to make and use the same.

This invention relates to starting devices for explosive engines.

The object of the invention resides in the provision of a device of this character which includes an operating lever and means for locking the lever to the crank shaft when the former is moved in one direction to effect the rotation of the crank shaft and which further includes means for automatically releasing the operating lever from the crank shaft in the event that the latter should be operated under the influence of the engine in a backward direction.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote accompanying parts in the several views, and in which—

Figure 1 is a front view of a fragment of an explosive engine showing the improved starting device associated therewith. Fig. 2 a side view of what is shown in Fig. 1. Fig. 3 a section on the line 3—3 of Fig. 1. Fig. 4 a section on the line 4—4 of Fig. 2. Fig. 5 a view similar to Fig. 1 showing the position of the parts when the device has just been operated by a backward rotation of the crank shaft to release the operating lever from connection with said crank shaft, and Fig. 6 a detail perspective view of the pawl carried by the operating lever.

Referring to the drawings, 10 indicates the crank shaft of an explosive engine and 11 a fragment of the body of said engine. Keyed upon the crank shaft 10 in spaced relation to the body 11 is a ratchet wheel 12. Bolted to the body 11 and provided with an opening through which the crank shaft 10 passes is a plate 13 and encircling the crank shaft and bolted to the plate 13 is a ratchet wheel 14 the teeth of which are directed toward the normal direction of rotation of the shaft 10.

Rotatably mounted upon a hub 15 formed on the front end of the ratchet wheel 14 is a ring 16 which is provided with an inwardly directed flange 17 at its periphery which overlies the toothed periphery of the ratchet wheel 14. The ring 16 is provided at diametrically opposite points with openings 18 and 19 in which are pivotally mounted spring controlled pawls 20 and 21 respectively. These pawls 20 and 21 are so positioned that they will ride over the teeth of the ratchet wheel 14 when the ring 16 is rotated in a direction corresponding to the direction in which the shaft 10 normally rotates but will lock with the teeth of said ratchet wheel 14 upon any tendency of the ring 16 to rotate oppositely to the normal direction of rotation of the shaft 10. In this manner it will be apparent that provision is made for locking the ring against rotation in one direction. The periphery of the ring 16 is provided at spaced points with notches 22 which correspond to the spaces between adjacent teeth of the ratchet wheel 12 and are adapted to simultaneously register with the opening between the teeth of said ratchet wheel 12.

The operating lever of the device is indicated at 23 and is shown provided at its inner end with a recess 24 which receives the shaft 10 and forms a suitable means whereby said operating lever may pivot about the shaft. Pivotally supported upon the inner side of the operating lever 23 is a pawl 25 the free end of the latter being directed inwardly so as to engage simultaneously with the teeth of the ratchet wheel 12 and with one of the notches 22 of the ring 16.

If it is desired to start the engine it is only necessary to apply the lever 23 to the shaft 10 in the manner shown in Fig. 1 when the pawl 25 will engage one of the teeth of the ratchet wheel 12 and also one of the notches 22 of the ring 16. When the parts are in this relation movement of the lever 23 to the right in Fig. 1 will effect a rotation of the ratchet wheel 12, shaft 10, and ring 16. If the engine does not start on one movement of the lever 23 to the right same may be returned to the position shown in Fig. 1 and again moved to the right until sufficient rotation is imparted to the shaft 10 to effect the starting of the engine. If during the operation just described the shaft 10 should be operated backward through the medium of the engine from any cause the ratchet wheel 12 will also be rotated backward and this rotation will tend to swing the lever 23 to the left in Fig. 1. However as the ring 16 is locked against rotation to the left in Fig. 1 it will be apparent that the pawl 25 will ride outwardly on one of the walls of a notch 22 and thus be disengaged from the ratchet wheel 12 so as to free the lever 23 from the influence of the shaft 10 and obviate the possibility of injury to the operator.

What I claim is:—

The combination with the crank shaft of an engine, a ratchet wheel fixed on said shaft, a second ratchet wheel engaged over the shaft and non-rotatably secured to a fixed part, a ring mounted on said second named ratchet wheel, pawls carried by said ring adapted to coöperate with the second named ratchet wheel to lock the ring against rotation in one direction, said ring being provided with notches at spaced points in its periphery, an operating lever adapted to rotatably engage the crank shaft, a pawl carried by said operating lever for simultaneously engaging the teeth of the first named ratchet wheel and a notch in said ring whereby the movement of said operating lever in one direction will produce a corresponding rotation of the first named ratchet wheel and the ring while an opposite rotation of said first named ratchet wheel will cause the wall of the notch of the ring in which the pawl is disposed to coöperate with said pawl and lift same out of engagement with the first named ratchet wheel.

In testimony whereof, I affix my signature, in presence of two witnesses.

LESTER M. MOWE.

Witnesses:
GRACE WARRA,
ENOCH E. MATHISON.